(12) United States Patent
Gennaro et al.

(10) Patent No.: US 8,015,038 B2
(45) Date of Patent: Sep. 6, 2011

(54) METHODS AND SYSTEMS FOR SALES TERRITORY WHITESPACING

(75) Inventors: Norman Gennaro, San Carlos, CA (US); Umesh Patel, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1451 days.

(21) Appl. No.: 10/755,162

(22) Filed: Jan. 8, 2004

(65) Prior Publication Data
US 2004/0158481 A1 Aug. 12, 2004

Related U.S. Application Data

(60) Provisional application No. 60/438,610, filed on Jan. 8, 2003.

(51) Int. Cl.
*G06Q 10/00* (2006.01)
(52) U.S. Cl. .................................................. 705/7.11
(58) Field of Classification Search .................. None
See application file for complete search history.

(56) References Cited

U.S. PATENT DOCUMENTS

| | | | |
|---|---|---|---|
| 4,853,852 A | | 8/1989 | Rosen |
| 5,862,325 A * | | 1/1999 | Reed et al. ................. 709/201 |
| 6,067,525 A * | | 5/2000 | Johnson et al. ............. 705/10 |
| 6,578,009 B1 * | | 6/2003 | Shinozaki .................. 705/36 R |
| 6,850,896 B1 * | | 2/2005 | Kelman et al. ............. 705/10 |
| 7,047,206 B1 * | | 5/2006 | Schultze .................... 705/7.15 |
| 2002/0032610 A1 * | | 3/2002 | Gold et al. ................. 705/20 |
| 2002/0059095 A1 * | | 5/2002 | Cook ......................... 705/10 |
| 2002/0077998 A1 * | | 6/2002 | Andrews et al. ........... 707/1 |
| 2002/0143651 A1 * | | 10/2002 | Kishi ......................... 705/26 |
| 2004/0093262 A1 * | | 5/2004 | Weston et al. ............. 705/10 |

OTHER PUBLICATIONS

Oracle Territory Management; User Guide, Release 11i(11.5.9); Part No. B10552-01 (Apr. 2003).
Oracle Corporation, "Oracle Sales and Marketing Connected Client User's Guide", Release 11, Mar. 1998.

* cited by examiner

*Primary Examiner* — Romain Jeanty
*Assistant Examiner* — Brandi P Parker
(74) *Attorney, Agent, or Firm* — Kilpatrick Townsend & Stockton LLP (57) ABSTRACT

A software tool enables sales organizations and sales representatives to graphically track past purchases from customers, as well as the customer's current holdings and install base of products and services, irrespective of whether the current holdings originated from the sales organization, from a competitor or from some non-competing supplier of goods or services. By tracking not only past purchases, but the totality of the customer's holdings, the sales representative may draw inferences from the customer's current installed base of products, identify new opportunities and potentially sell additional or complementary products to the customer. The tracked information is stored in a central repository such as a database, enabling the employer to maintain control over the information, thereby enabling the information to persist even after the sales representative has left the employ of his or her current employer. The central repository is preferably selectively available over a computer network, via a Web browser, for example.

13 Claims, 7 Drawing Sheets

File  Edit  View  Go  Help

WhiteSpace  102  Accounts / List / My Profile

Region:
- All
- Canada_Central
- Canada_Telcco
- Canada_Transport
- Canada_West
- FS_Central
- GBWest
- GB_MidaAmerica
- GB_North Central
- GL_Central Industry:
- All
- Advertising
- Apparel
- Construrction
- Consumer
- Distribution
- Education
- Energy Company
Userid ○ HTML  ○ Excel 97  ○ Excel 2000

[Search]

Please select the join condition  ● AND  ○ OR  402

Products

Opportunity  Unknown  Oracle  Competitor

Name of Competitor

START                                                                                          Local Intranet

FIG. 5

| File | Edit | View | Go | Help | | | |
|---|---|---|---|---|---|---|---|
| ↓ | ↑ | ↻ | 🏠 102 | | | | |

WhiteSpace | Accounts | List | My Profile

Company: ABC Co.
Region: OPIAUTO
Industry: MANUFACTURING
DUNS Number:
Ref. Comments:
Comments:
Field Reportable: ☐
Greenfield Account: ☐
Call Plan: Upload Call Plan File
My Favorite Account: ☐
Last Updated: T. Smith on August 14, 2001 02:08 PM  ← 506

Account Teams: Add/Chg  ← 502
| Type | iSD Role | |
| Field Rep. | N/A | David Smith |
| iSD Rep. | TS | Jubal Harshaw |
| iSD Rep. | TSR | Jane Dough |
| Terr. Assigned iSD Rep | TS | M. V. Smith |
| Unknown | N/A | |

[Update Account]   [Delete Account]

| Product Category | Product | Rating | Competitor | Version | Seat | Misc. |
|---|---|---|---|---|---|---|
| DATABASE 504 | Enterprise DB | Unknown | | | | |
| | Data Warehouse | Unknown | | | | |
| | Backend | | | | | |
| | High Avail./Sec. | Unknown | | | | |
| APP SERVER | App Server | | | | | |

START | | | | | | Local Intranet

METHODS AND SYSTEMS FOR SALES TERRITORY WHITESPACING

This application claims the benefit under 35 U.S.C. §119 (e) of Provisional Patent Application Ser. No. 60/438,610, filed Jan. 8, 2003.

BACKGROUND OF THE INVENTION

1. Field of the Invention

The present invention relates to a sales territory planning and targeting tool that displays install base, competitive and opportunity information in a graphical format, and allows the user to generate target contact lists based on subsets of the data in their territory.

2. Description of the Related Art

Sales persons within an organization are typically assigned a territory (geographical or by industry, for example) in which to sell their employer's products or services. How well the sales representatives know their territory is often directly proportional to their sales as well as to their compensation. To keep track of the products or services they have sold to their customers, sales representatives often employ a series of manually maintained spreadsheets detailing the sales information.

When sales representatives leave their employer, they tend to take these spreadsheets with them, thereby depriving the former employer of the intelligence they may have gathered during their tenure with the company. The next sales representative, therefore, may have to again gather this information, as well as gather all information regarding the competitive landscape of their assigned sales territory.

There is a need, therefore, for a centralized repository of such sales information that survives changes in the sales force (e.g., departures of sales representatives or the addition of sales representatives).

When sales representatives call on their customers (in person, over the phone or over the Web), they seek to learn as much about the customer as they can, in the hope of identifying potential sales opportunities. Usually, the most important information to be gathered concerns unmet needs that the customer may have. For example, the customer may have purchased a database from one vendor and an Accounts Receivable (AR) application from another. However, the sales representative may have determined, through conversations with the customer, that the customer currently lacks a financial reporting tool that interfaces with the database provided by the first vendor. This would be termed an opportunity and the sales representative may attempt to sell the customer a suitable product from the offerings of his or her employer to fill this identified customer need.

When a sales representative is assigned a new account, he or she may record the information related thereto in a spreadsheet. A row of the spreadsheet may be assigned to the customer company and the columns of the spreadsheet may be assigned to the products that the sales representative sells. All of these cells (intersections of the rows and columns) are white (blank) to start off with (hence the term "whitespace") and the sales representative is supposed to ask the customer questions until he or she is able to fill all of the whitespaces with the appropriate information. The account is then considered to be fully mapped. However, the sales representative does not typically track the customer's installed base of products, other than described above. For example, the sales representative conventionally does not make entries in his or her spreadsheet relative to products from competitors or non-competitors already installed at the customer site, as no opportunities exist for such products. The existing sales information gathering and tracking methodologies, therefore, do not paint a complete picture of the sales representative's customers existing installed product or services base. Moreover, such incomplete picture is not persistent (often disappearing along with the sales representative as the sales representative leaves for another job), and is not typically available to others within the sales representative's sales organization. Therefore, potential opportunities may be lost and the employer may lose potential sales and the next sales representative may lose potential commissions.

From the foregoing, it is clear that there is a need for greater consolidation of customer information, in terms of eliminating redundancy of customer data in ERP and CRM systems (for example), in terms of sales representative territory assignment and in terms of competitive and install base data to eliminate unnecessary redundancy and provide richer access to central sales information.

SUMMARY OF THE INVENTION

According to an embodiment thereof, the present invention may be viewed as a computer implemented method for a salesperson to track and identify sales opportunities within a sales territory, comprising the steps of providing, from customers of the salesperson within the sales territory, information regarding customers' needs and information regarding an install base of products and/or services of the customers, the provided install base information including origination information indicating those products and/or services that originate from an employer of the salesperson and those products and/or services that originate from competitors of the salesperson's employer; from the provided customers' needs and install base information, tagging as sales opportunities those products and/or services offered for sale by the sales representative that match the customers' needs and those products and/or services of the customers' install base of products and/or services offered by the sales representative that the customers are likely to consider purchasing; storing the provided information in a database that is controlled by the salesperson's employer and that is accessible over a computer network, and providing the stored information in a tabular worksheet on a computer coupled to the network, the tabular worksheet being organized across the customers in the salesperson's sales territory and the products and/or services offered for sale by the salesperson, entries in the tabular worksheet identifying sales opportunities, the customers' install base of products and/or services, the origination information and unknown information that identifies where the sales representative should gather additional install base information.\

According to further embodiments, entries in the tabular worksheet may be visually coded according to whether the entries are identified as sales opportunities, whether the entries originate from the sales representative's employer or a competitor or whether the entries represent unknown information. The providing step may provide the entries in the tabular worksheet in a color-coded format, for example. The provided information may be selectively accessible, according to a sales hierarchy of the salesperson's employer, for example. The provided information in the tabular worksheet in the providing step may be limited to results of a search on the information stored in the database. For example, the search may be carried out for one or more parameters selected from customer, region, industry, product, service, origination information and/or unknown information, for example. A step of customizing an appearance and/or ordering of the entries within the provided tabular worksheet may also be carried out.

According to a further embodiment thereof, the present invention may be viewed as a software application configured to enable a salesperson to track and identify sales opportunities within a sales territory over a network, and comprising, stored on a computer-readable medium: code configured to store customer information in a database that is controlled by the salesperson's employer and that is accessible over a computer network, the customer information including information regarding customers' needs and information regarding an install base of products and/or services of the customers, the install base information including origination information indicating those products and/or services that originate from an employer of the salesperson and those products and/or services that originate from competitors of the salesperson's employer; code configured to tag as sales opportunities the customer information corresponding to those products and/or services offered for sale by the sales representative that match the customers' needs and those products and/or services of the customers' install base of products and/or services offered by the sales representative that the customers are likely to consider purchasing, and code configured to provide the stored information in a tabular worksheet on a computer coupled to the network, the tabular worksheet being organized across the customers in the salesperson's sales territory and the products and/or services offered for sale by the salesperson, entries in the tabular worksheet identifying sales opportunities, the customers' install base of products and/or services, the origination information and unknown information that identifies where the sales representative should gather additional install base information.

The software application may include code for visually coding entries in the tabular worksheet according to whether the entries are identified as sales opportunities, whether the entries originate from the sales representative's employer or a competitor or whether the entries represent unknown information. The code for visually coding entries may be configured to provide the entries in the tabular worksheet in a color-coded format, for example. The code configured to provide the stored information in a tabular worksheet may be further configured to render the customer information selectively accessible according to a sales hierarchy of the salesperson's employer. The code configured to provide the stored information in a tabular worksheet may be further configured to limit the customer information in the tabular worksheet to results of a search on the information stored in the database. Code may also be included that is configured to carry out the search for at least one parameter selected from customer, region, industry, product, service, origination information and unknown information. Code may also be included that is configured to customize an appearance and ordering of the entries within the provided tabular worksheet.

BRIEF DESCRIPTION OF THE DIAGRAMS

DETAILED DESCRIPTION

An embodiment of the present invention may include a central repository of customer information relating to all products installed (and/or services in use) at a customer site, irrespective of whether the products and/or services (hereafter, products) were sold by the salesperson's employer or by competitors thereof (the origination information). The central repository may be configured to store customer information at any desired level of granularity and advantageously includes information relating even to the customer's installed products that are not offered by the sales representative's employer, in order to gain as complete a picture of the customer's install base as possible. Such central repository, according to embodiments of the present invention, may be selectively accessed by a variety of tools, including a web-based database tool that enables selective access and controlled to the gathered information across the organization.

The present whitespace tool enables the sales representative to not only track the products and/or services that the sales representative sells, but also other potentially relevant items such as hardware, telephone equipment, even through the sales representative may not sell such products or offer such services. For example, some of customers may have previously purchased the sales representative's products but may be unhappy with them (which represents the potential loss of the customer), the customer may want to buy additional products or services (which represents an opportunity) or the customer may have bought a competitive product and be satisfied with that decision (competitor-won) or may be dissatisfied with that decision (which also represents an opportunity). Alternatively, the customer may not have decided on a vendor yet (which also represents an opportunity). Embodiments of the present whitespacing tool allow the sales representative to track all of those values and not lose any data (just because it is not an opportunity does not mean that the sales representative should not know who the competitor is). Doing so enables the sales representative and the sales representative's employer to potentially leverage the collected information into additional sales, either now or in the future.

Embodiments of the present whitespacing tool may find their greatest utility when used by, for example, sales representatives, sales managers and administrators. Each of these categories of users may be assigned specific rights and responsibilities, such as described below. A sales representative may be given the right to view and search through accounts within his or her territory, to generate contact lists from the accounts within his or her territory, and to maintain install base and competitive information of customers within his or her territory. The sales representative may also be allowed to bookmark and/or classify accounts for easy retrieval. The sales manager user may be granted all of the rights granted to the sales representatives, in addition to the ability to view information by sales group hierarchy, and product whitespace usage/activity reports within his/her jurisdiction, for example. Sales manager may build worksheets (such as the tabular worksheet 102 in FIG. 1) or lists (such as a contact list derived therefrom, for example) for any individual one or for all of the sales persons reporting to them.

Figure 6:
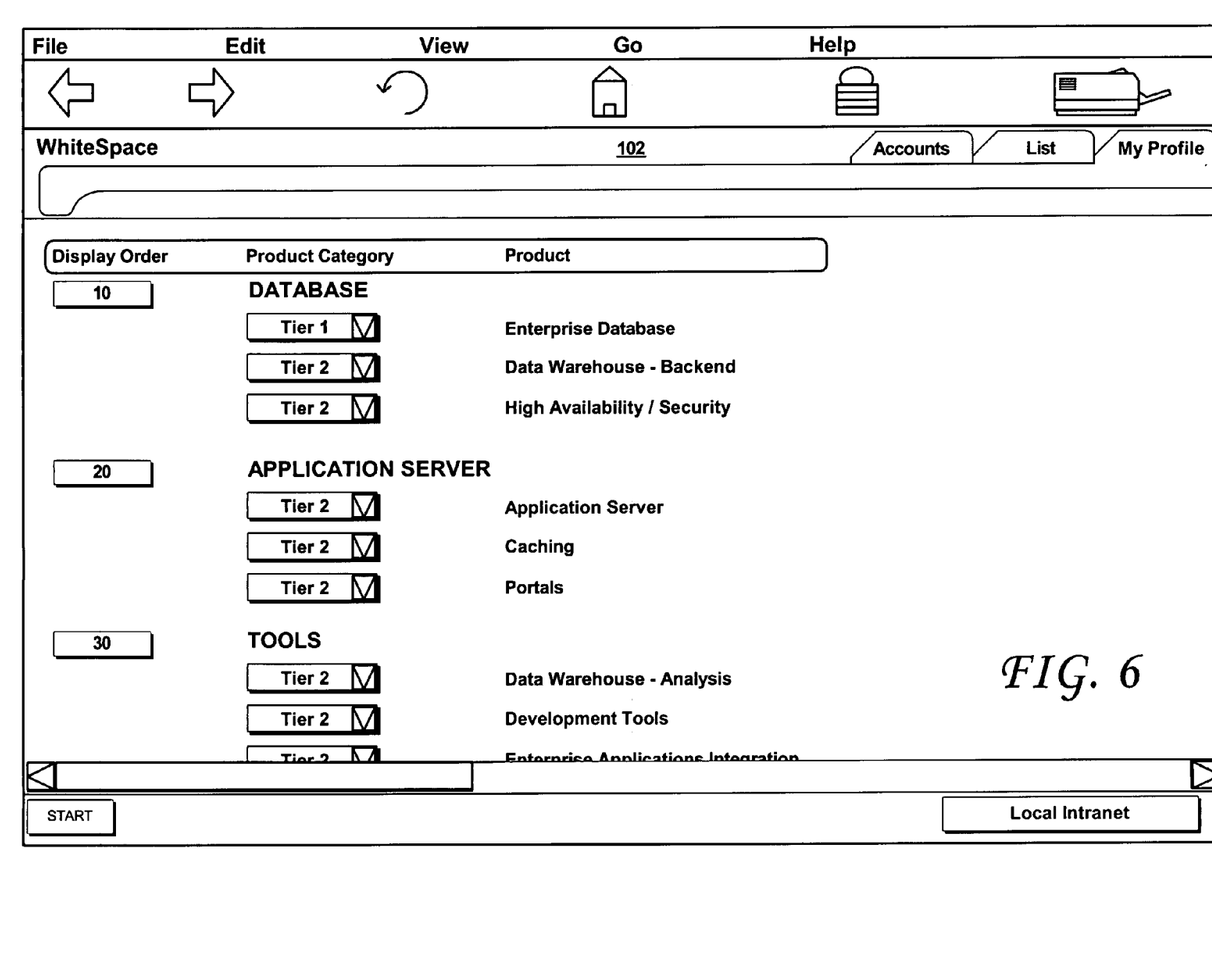
FIG. 6 is a representation of a personal profile, enabling the user to customize the column ordering and "tier" designation of the coded worksheet of FIG. 1.

The administrator user may be granted all of the rights granted to sales representatives and sales managers, in addition to the right and responsibility to maintain administrative settings. For example, administrators may be granted the right and responsibility to maintain product categories and product lists separate from a Bill of Materials (BOM), to maintain "tier" designations on products and categories, as shown in FIG. 6, to add and split product categories, to associate campaign codes with products and categories, to maintain list of competitors and to maintain mapping of responsibilities to users, for example. This may be carried out by setting the users' permission levels according to the company's existing sales hierarchy (for example) so as to limit the sales data accessible to any one person. Moreover, administrators may be given the right unrestricted right to construct worksheets such as shown at 102 system wide or lists derived therefrom (such as contact lists, for example).

By identifying not only the whitespaces that correspond to unmet customer needs, but also by identifying the customer's own installed base of products or services utilized, the sales representative may develop a true assessment of the existing and potential sales opportunities that exist for any particular customer or potential customer. By graphically presenting customers' installed base and whitespaces in columnar or tabular format and by color (or otherwise) coding the entries, the sales representative may gain an immediate, intuitive and comprehensive knowledge of the competitive landscape of his or her sales territory, as well as identify existing and potential opportunities. By centrally storing such information in a database controlled by the sales representative's employer, this information may be selectively and persistently exposed across the sales organization or across the company. Moreover, by centrally storing this information, the sales representative's employer maintains ownership of the information, even after the eventual departure of the sales representative from the company.

Figure 1:
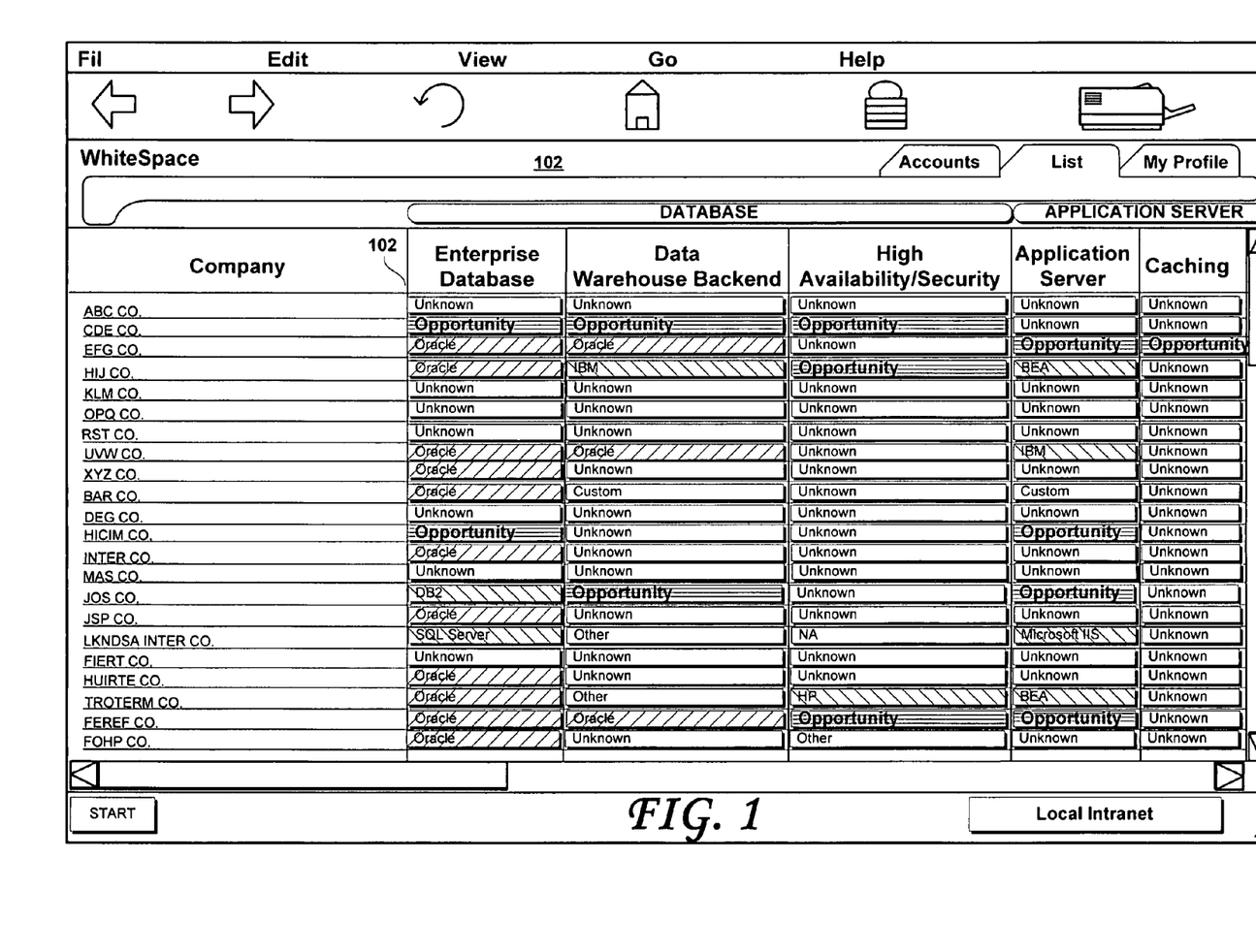
FIG. 1 is a representation of the web-based competitive whitespace tool on a web browser, according to an embodiment of the present invention
Figure 2:
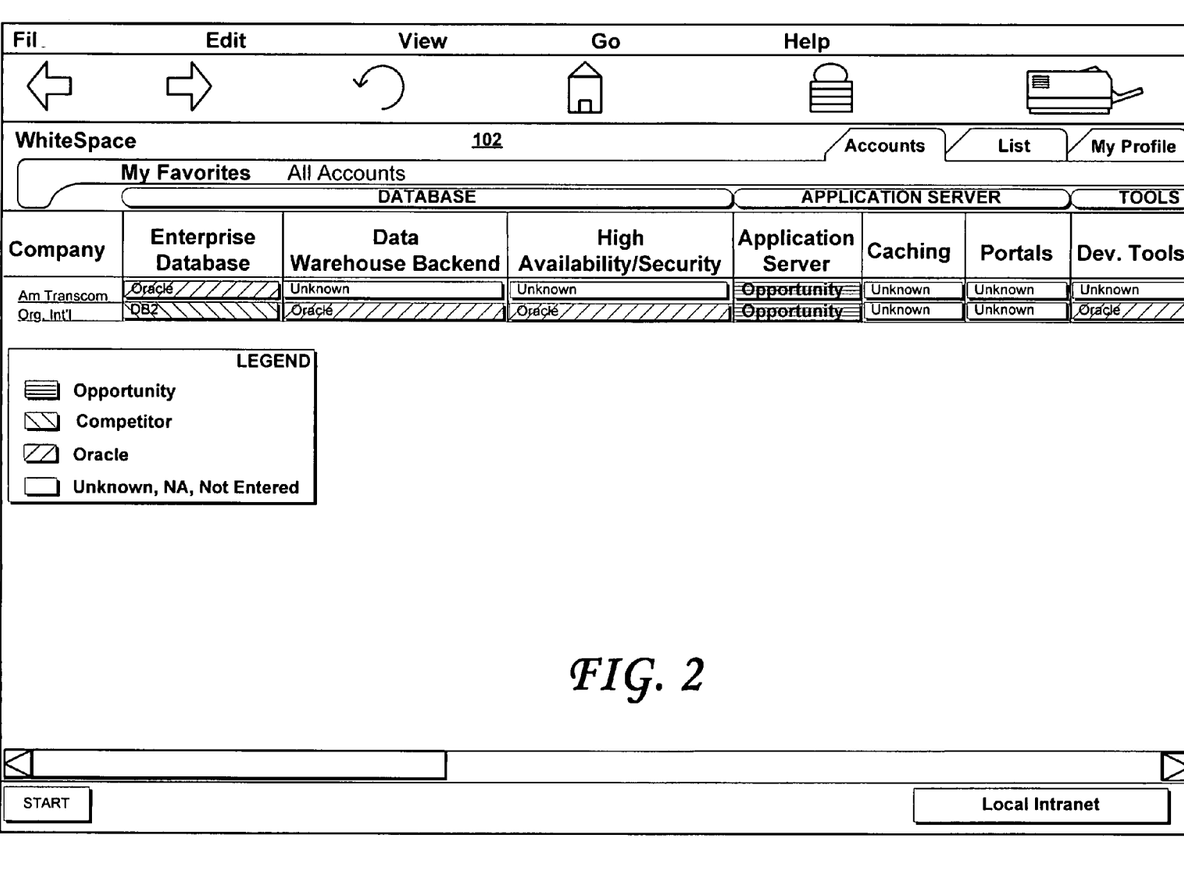
FIG. 2 is a representation of a of a "Favorites" folder, showing a coded worksheet characterizing installed base of a selected customer or customers.

Within the figures, it is to be understood that the name of the sales representative's employer or company may be substituted for the label "Oracle". FIG. 1 is a representation of aspects of a web-based competitive whitespace tool (e.g., a web-enabled application) according to an embodiment of the present invention, showing a coded tabular worksheet 104. The tabular worksheet 104 may be organized as shown in FIG. 1; that is, across the customers in the salesperson's sales territory and the products and/or services offered for sale by the sales representative's employer that the sales representative is charged with selling. In the representation of FIG. 1, the different cells of the worksheet may be coded by hashing—that is, by varying the appearance of the hash marks. In the actual implementation, the coded tabular worksheet may advantageously be color coded, so as to render information more readily assimilable. As shown, the application deploying the competitive whitespace tool according to the present invention may be a web-based application and may use a web browser 102, such as, for example, Microsoft Explorer. As shown, a list of companies within the salesperson's territory (the definition of the salesperson's territory may be taken from the Customer Relationship Management (CRM) application, if available) may be displayed, along with a coded indication of the customers' installed base (of software, in this example). For example, in this exemplary view, the fictional company HIJ Co. has an Oracle enterprise database installed, an IBM data warehouse backend and an application server from BEA. These products, therefore, may not present immediate present sales opportunities for the sales representative, but provide the sales representative with a fuller picture of the customer's installed base. From information gathered from HIJ Co. itself, the sales representative learns that HIJ Co. does not currently have High Availability/Security applications installed. This is, therefore, an opportunity. It is currently unknown whether HIJ Co. has an application server caching application, which field is, therefore, labeled "Unknown". This should prompt the sales representative to attempt to elicit that information from the customer—HIJ Co., in this case. For those fields that indicate that a competitor's product is currently installed, no immediate present opportunity exists. However, the sales representative may be able to use that information to his or her advantage, drawing from the capabilities of his or her employer's product offerings. For example, the sales representative might suggest another product that is compatible with the existing competitor's product. Within the context of the present invention, the terms "sell" and "sales" are intended to cover not only outright sales of products and/or services, but also leases and other forms of transfer of rights and/or ownership for valuable consideration. All of the information entered and displayed in the present tool may be selectively accessed by this and other applications. Queries may be formulated against such data, to derive new information therefrom. Such queries may include, for example, PL/SQL commands, as is known in the art. Preferably, the sales representative would then concentrate his or her sales efforts within those areas marked "Opportunity" in the present whitespace tool and should strive to fill in the cells marked with the legend "Unknown" by gathering the requisite information form the customer. A legend for interpreting the hashing in FIG. 1 is shown in FIG. 2. The sales person may also include attachments in the form of screenshots or collaboration (whiteboard) printouts, to the company and contact (for example) fields in the worksheet 102.

FIG. 2 is a representation of a of an exemplary "Favorites" folder within the present whitespace tool, according to an embodiment of the present invention. This representation shows a (e.g., color-coded worksheet characterizing installed base of a selected customer or a group of selected customers. The information presented by the present whitespace tool may advantageously be color-coded, so as to enable the immediate, at-a-glance identification of the opportunities, the unknown fields and the customer's existing installed product base. FIG. 2 shows the coded display of selected ones of the customers (within the sales representative's territory, for example). For example, cells listing competitors' products may be colored red, the sales representative's employer's products may be colored yellow, opportunities green and unknowns blue. Other color schemes and/or visual or other sensory effects may also be devised. By viewing (whether in the worksheet of FIG. 1 or the "Favorites" worksheet of FIG. 2, the install base of a parent company with that of its subsidiary, the sales representative may gain valuable information that may allow him or her to leverage any difference in the respective install bases into additional sales.

Figure 3:
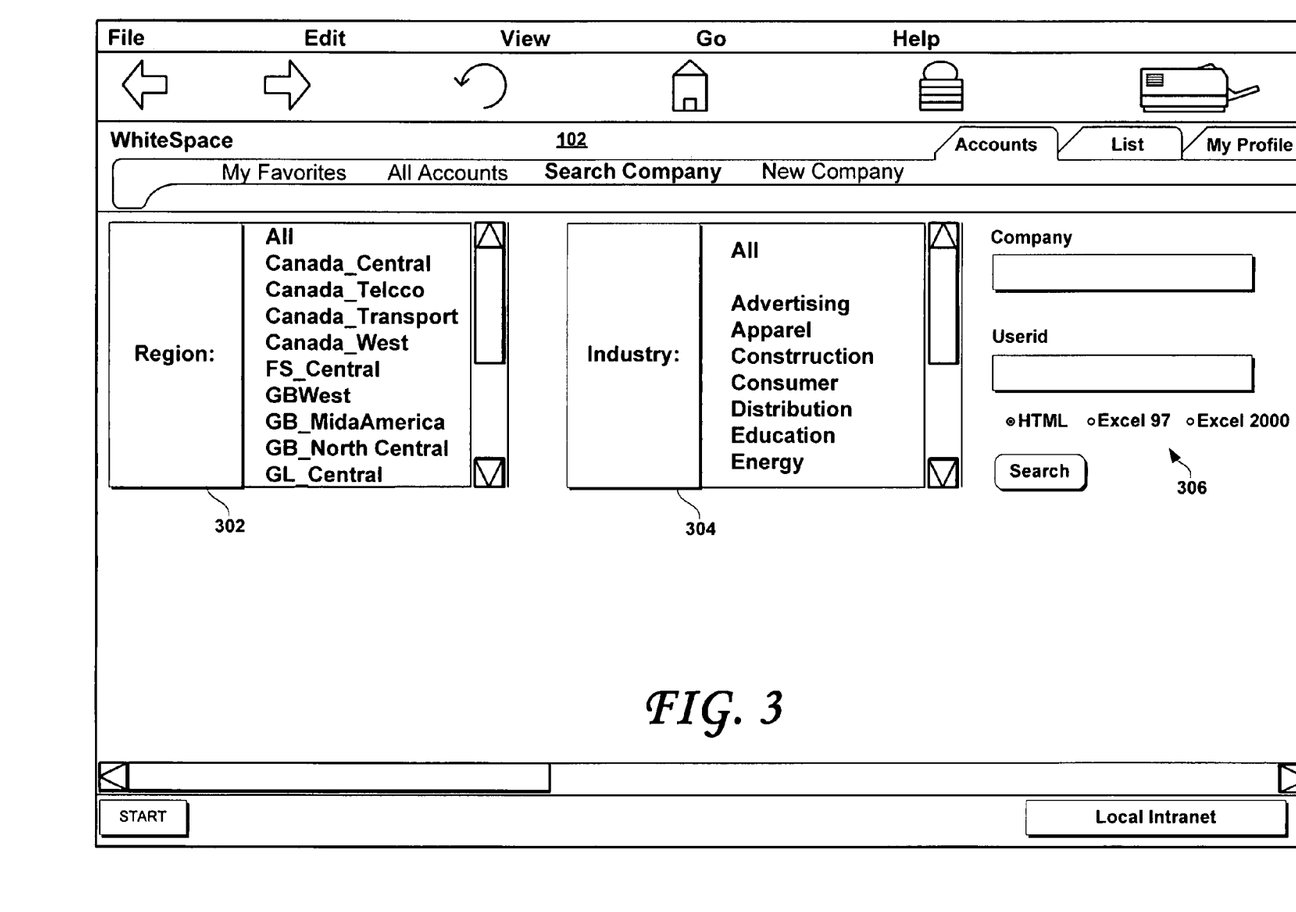
FIG. 3 is a representation of search screen for viewing and editing company information, according to an embodiment of the present invention.

FIG. 3 is a screen shot of a basic search screen for viewing and editing company information, according to an embodiment of the present invention. The views of the competitive landscape afforded by the present invention are entirely customizable. By means of the screen shown in FIGS. 3 and 4, a worksheet similar to that shown in FIG. 1 may be generated for a selected sales region or regions as shown at 302, for a selected customer industry or industries as shown at 304 and displayed in a variety of formats including HTML or Excel as shown at 306, among a number of other possible output formats.

Figure 4:
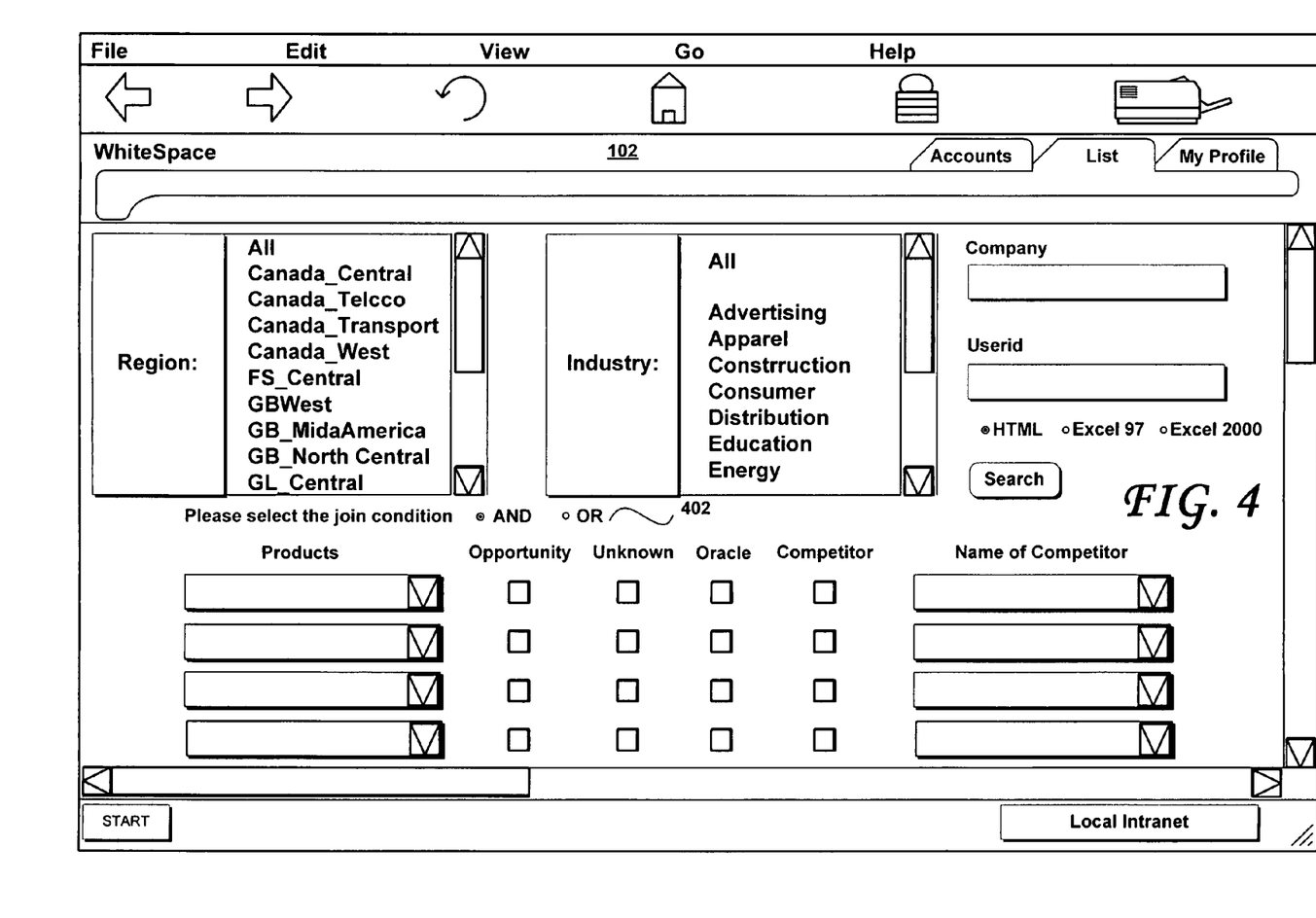
FIG. 4 is a representation of an enhanced search screen for selecting company information to generate contact lists.

FIG. 4 is a representation of an enhanced search screen for selecting company information to generate contact lists, according to an embodiment of the present invention. As shown in FIG. 4, the worksheet of FIG. 1 may be generated and customized not only according to the criteria shown in and discussed relative to FIG. 3, but also for a specific product or products. To generate the worksheet 102 of FIG. 1, the salesperson's territory may also be searched according to most any account parameters, such as name, city, state, zip, industry classification, user classification (i.e. bookmarks) or reference status, for example. A worksheet such as shown at 102 may also be generated according to product and/or solution parameters. Several parameters may be combined or some parameters may be excluded from the generated worksheet 102 by using the toggle 402 of Boolean operators (e.g., the logical AND or OR operators) or any combination of products, identified competitor, status of install (unknown, opportunity, competitor, etc.). The above exemplary criteria, therefore, allow a fine grained control over the manner in which the gathered information is presented to the user by the present whitespace tool. The list generation capability of embodiments of the present invention enable the user to generate lists including, for example, a status of product/solution for a single account, to register and/or maintain competitors per product solution area, and/or to register and/or maintain multiple competitors per solution.

Figure 5:
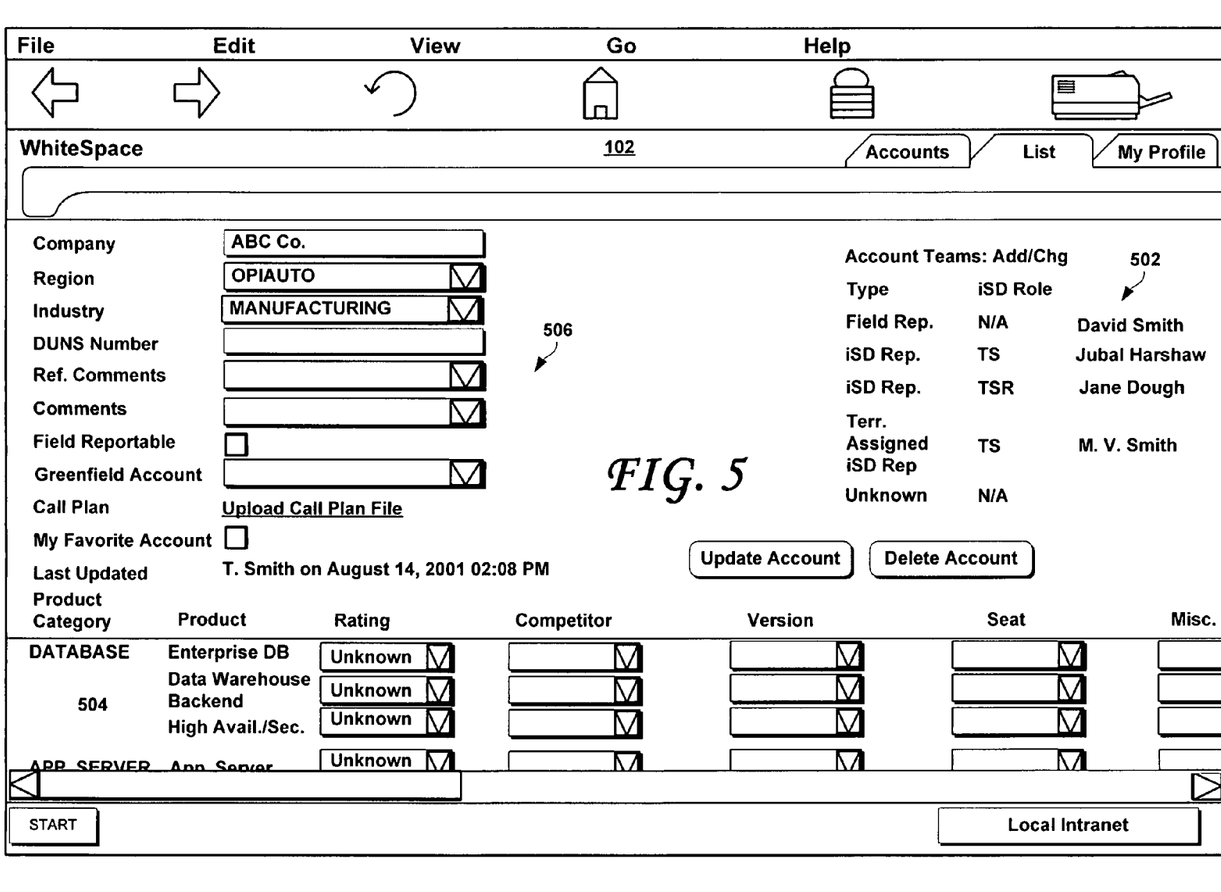
FIG. 5 is a representation of a company drill-down on a selected company name in the worksheet shown in FIG. 1.

FIG. 5 is a representation of another aspect of an embodiment of the present invention. As shown, FIG. 5 shows a representation of a company drill-down on a selected company name in the worksheet shown in FIG. 1. By selecting one of the companies listed in FIG. 1 (for example) by entering some or all of the information requested at 506, the present invention may provide the information shown in FIG. 5. The information requested at 506 may include, for example, company name, location (e.g., region), industry, DUNS number, comments, Greenfield account, whether the company should appear in the "My favorites" list shown in FIG. 2, to name only a few of the possible fields. Comments or notes may be entered for each field or cell of the worksheet 102 or generated list. For example, notes may be entered for any customer, product solution or contact.

For example, ABC, Co. is shown to be in the auto manufacturing business and ABC's installed base 504 may be presented in as fine-grained manner as desired by the sales representative. The sales representative or persons assigned to the ABC Co. account may also be listed, as indicated at 502. The present invention may also be advantageously configured to provide the current version number of the installed products, the number of licenses for such products purchased by ABC, Co. and any other information that would be helpful in servicing this particular customer. This enables the salesperson to track his or her customer's purchase/order history including products and version or release numbers. New information regarding this customer's install base may conveniently be entered within the fields shown at 504.

FIG. 6 is a screen shot of a personal profile, enabling the user to customize the column ordering and "tier" designation of the coded worksheet of FIG. 1. The display of FIG. 1 is customizable not only in terms of content, but also in terms of appearance. That is, the user may select the order in which the information is presented, according to the sales representative's priorities, for example. For example, items affording the sales representative a higher commission may be displayed first, before items associated with a lesser commission, for example.

Embodiments of the present invention, therefore, provide a uniform framework for collecting, storing and displaying customer information. By storing the customer information gathered to populate the fields of the display of FIG. 1 in a centralized database controlled by the sales representative's employer, the company retains possession of and control over the information generated by its sales force, even after they depart for another employer.

Tracking not only past sales to customers but also the customer's current holdings of competitor's products (whether a comparable product is offered by the company or not) according to embodiments of the present invention, gives the sales representative a fuller picture of his or her customer or prospective customer. For example, even through the sales representative's employer may not offer CAD/CAM products, it may nevertheless be useful to track the fact that the customer deploys a particular CAD/CAM solution. This information may enable the sales representative to make inferences therefrom to offer additional products or services that may interface with or augment the functionalities, stability or reliability of the customer's installed CAD/CAM package. Therefore, embodiments of the present invention allow the sales representative to track the customer's current (and/or projected) install base, whether or not the sales representative's employer has corresponding offerings for all of the tracked items.

To help the sales person in sketching out the customer's current install base and to identify potential opportunities, embodiments of the present invention may advantageously be used in combination with the inventions described and shown in copending and commonly assigned and co-pending U.S. application Ser. No. 10/755,195 entitled "Methods And Systems For Collaborative Whiteboarding and Content Management", the disclosure of which is hereby incorporated herewith in its entirety.

Hardware Description

Figure 7:
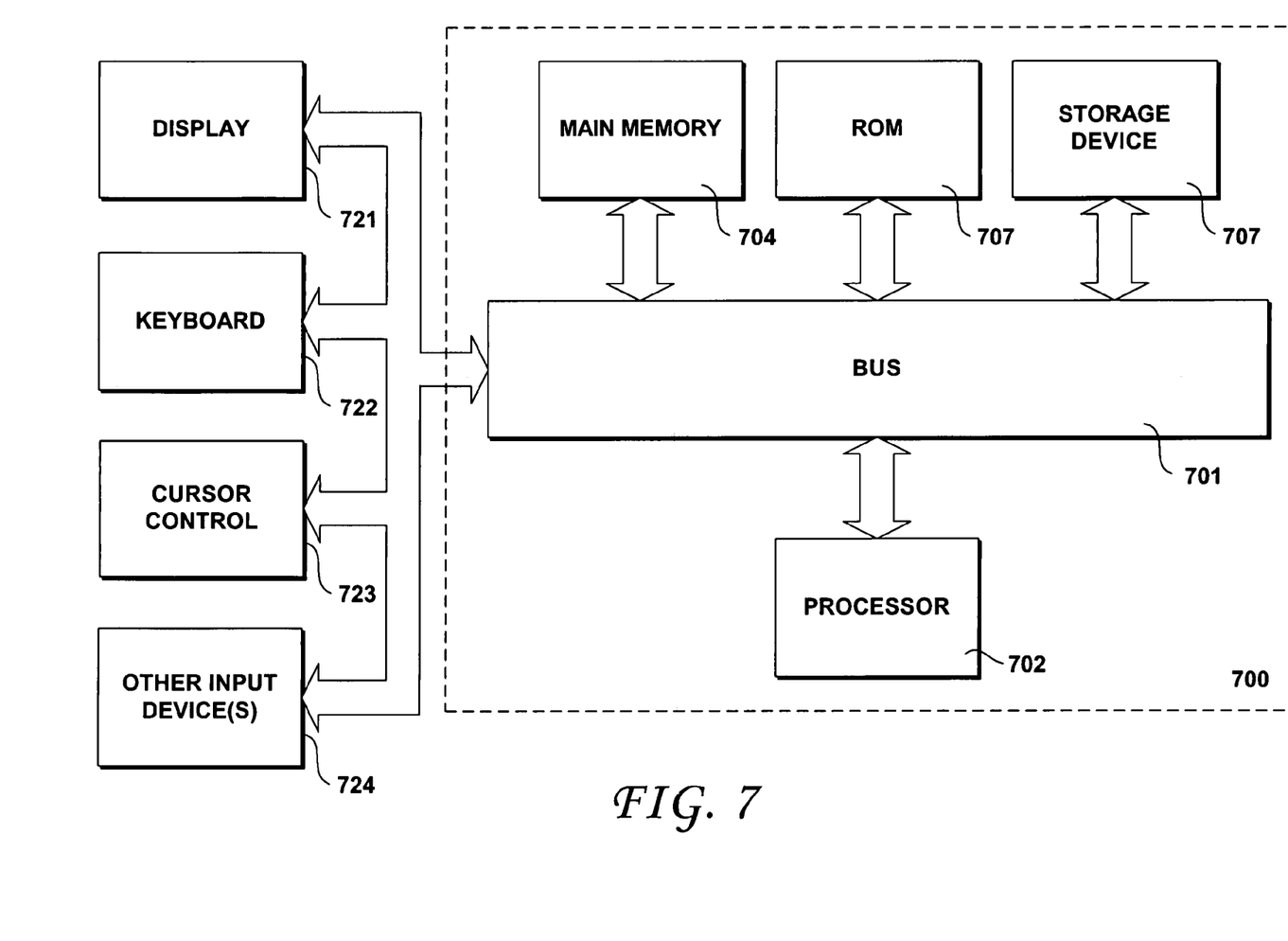
FIG. 7 is a block diagram of a computing device with which the methods of the present invention may be implemented.

FIG. 7 illustrates a block diagram of a computing device 700 with which an embodiment of the present invention may be implemented. Computing device 700 includes a bus 701 or other communication mechanism for communicating information, and a processor 702 coupled with bus 701 for processing information. Computing device 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computing device 700 may also include a read only memory (ROM) and/or other static storage device 706 coupled to bus 701 for storing static information and instructions for processor 702. A data storage device 707, such as a magnetic disk or optical disk, may be coupled to bus 701 for storing information and instructions. A communication device 708, such as a modem or network (such as Ethernet, for example) card is also coupled to the bus 701 to provide access to a network (such as an intranet or the Internet, for example).

The computing device 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device may be user's own voice or cursor control 723, such as a mouse, a trackball, or cursor direction keys for communicating direction information and command selections to processor 702 and for controlling cursor movement on display 721.

The present invention is related to the use of computing device 700 to implement the present territory whitespace tool. According to one embodiment, the sharing is carried out by one or more computing devices 700 in response to processor(s) 702 executing sequences of instructions contained in memory 704. Such instructions may be read into memory 704 from another computer-readable medium, such as data storage device 707 and/or from a remotely located server. Execution of the sequences of instructions contained in memory 704 causes processor(s) 702 to implement the whitespacing and content management functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

FIG. 7 illustrates a block diagram of a computing device 700 with which an embodiment of the present invention may be implemented. Computing device 700 includes a bus 701 or other communication mechanism for communicating information, and a processor 702 coupled with bus 701 for processing information. Computing device 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computing device 700 may also include a read only memory (ROM) and/or other static storage device 706 coupled to bus 701 for storing static information and instructions for processor 702. A data storage device 707, such as a magnetic disk or optical disk, may be coupled to bus 701 for storing information and instructions. A communication device 708, such as a modem or network (such as Ethernet, for example) card is also coupled to the bus 701 to provide access to a network, such as the Internet, for example.

The computing device 700 may also be coupled via bus 701 to a display device 721 for displaying information to a computer user. An alphanumeric input device 722, including alphanumeric and other keys, is typically coupled to bus 701 for communicating information and command selections to processor 702. Another type of user input device may be user's own voice or cursor control 723, such as a mouse, a trackball, or cursor direction keys for communicating direction information and command selections to processor 702 and for controlling cursor movement on display 721.

The present invention is related to the use of computing device 700 to implement a computer network enabled sales territory whitespace tool, as described and shown herein. According to one embodiment, the sharing is carried out by one or more computing devices 700 in response to processor(s) 702 executing sequences of instructions contained in memory 704. Such instructions may be read into memory 704 from another computer-readable medium, such as data storage device 707 and/or from a remotely located server. Execution of the sequences of instructions contained in memory 704 causes processor(s) 702 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for discovering sales opportunities within a sales territory, the method comprising:

identifying, for each customer in a set of one or more customers within the sales territory, a first set of products and/or services for the customer, wherein each product or service in the first set of products and/or services of the customer is identified as satisfying one or more needs of the customers;

identifying, with one or more processors associated with one or more computer systems, for each customer in the set of customers within the sales territory, a second set of products and/or services for the customer, wherein the second set of products and/or services identifies a provider entity for each product or service in the second set of products and/or services determined to be currently or formerly installed at a customer site of the customer or to be currently or formerly in use by the customer;

determining, with one or more processors associated with one or more computer systems, sales opportunities within the sales territory that indicate at least one of:

a third set of products and/or services offered for sale by at least one salesperson associated with the sales territory that satisfy one or more customer needs, the third set of products and/or services determined based on a match with one or more products and/or services from the first set of products and/or services of at least one customer in the set of customers within the sales territory, and a fourth set of products and/or services offered for sale by at least one salesperson associated with the sales territory that the customers are likely to consider purchasing, the fourth set of products and/or services determined based on a match with one or more products and/or services from the second set of products and/or services of at least one customer in the set of customers within the sales territory;

formulating a search based at least in part on a selection of one or more parameters related to the customers within the sales territory in the salesperson's sales network and products and/or services offered for sale by a given salesperson; and generating results of the search to be displayed to the given salesperson for the customers in the sales territory, the results of the search including at least the determined sales opportunities, the first set of products and/or services for each customer, and the second set of products and/or services for each customer.

2. The method of claim 1, wherein generating the results of the search to be displayed to the given salesperson further comprises generating a tabular worksheet organized across the customers and the products and/or services offered for sale by the given salesperson, entries of the tabular worksheet being visually coded according to whether the entries are the determined sales opportunities, whether the entries represent the second set of products/services, or whether the entries represent unknown information.

3. The method of claim 1, further comprising:
receiving, information specifying a sales hierarchy of the given salesperson's employer, each role in the sales hierarchy having a set of predetermined rights and responsibilities; and
wherein the results of the search to be displayed to the given salesperson is selectively accessible according to a role of the given salesperson defined in the sales hierarchy of the given salesperson's employer.

4. The method of claim 2, further comprising:
receiving information provided by the given salesperson's manager defining the tabular worksheet for the given salesperson; and
wherein generating the results of the search to be displayed to the given salesperson comprises generating the results of the search to be displayed to the given salesperson based on the information provided by the given salesperson's manager defining the tabular worksheet for the given salesperson.

5. The method of claim 4, wherein the search is carried out for at least one parameter selected from customer, region, industry, product, service, origination information and unknown information.

6. The method of claim 2, further comprising:
receiving information provided by a manager of the given salesperson defining the tabular worksheet for the salesperson; and
customizing an appearance and ordering of the entries within the tabular worksheet based on the information provided by the manager of the given salesperson.

7. A non-transitory information storage medium storing computer-executable code for discovering sales opportunities within a sales territory, the non-transitory information storage medium comprising:
code configured to identify, for each customer in a set of one or more customers within the sales territory, a first set of products and/or services for the customer, wherein each product or service in the first set of products and/or services of the customer is identified as satisfying one or more needs of the customer;
code configured to identify, for each customer in the set of one or more customers within the sales territory, a second set of provided products and/or services for the customer, including identifying a provider entity for each provided products and/or services, wherein the second set of products and/or services identifies a provider entity for each product or service in the second set of products and/or services determined to be currently or formerly installed at a customer site of the customer or to be currently or formerly in use by the customer;
code configured to determine sales opportunities within the sales territory that indicate at least one of:
a third set of products and/or services offered for sale by at least one salesperson associated with the sales territory that satisfy one or more customer needs, the third set of products and/or services determined based on a match with one or more products and/or services from the first set of products and/or services of at least one customer in the set of customers within the sales territory, and
a fourth set of products and/or services offered for sale by at least one salesperson associated with the sales territory that the customers are likely to consider purchasing, the fourth set of products and/or services determined based on a match with one or more products and/or services from the second set of products and/or services of at least one customer in the set of customers within the sales territory;
code configured to formulate a search based at least in part on a selection of one or more parameters related to the customers within the sales territory and products and/or services for sale by a given salesperson; and
code configured to generate results of the search to be displayed to the given salesperson for the customers, the results of the search including at least the determined sales opportunities, the first set of products and/or services, and the second set of products and/or services.

8. The non-transitory information storage medium of claim 7, wherein generating the results of the search to be displayed to the given salesperson further comprises generating a tabular worksheet organized across the customers and the products and/or services offered for sale by the given salesperson, entries of the tabular worksheet being visually coded according to whether the entries in the tabular worksheet are the determined sales opportunities, whether the entries represent the second set of products/services, or whether the entries represent unknown information.

9. The non-transitory information storage medium of claim 8, wherein the code for generating the tabular worksheet is configured to provide the entries in the tabular worksheet in a color-coded format.

10. The non-transitory information storage medium of claim 7, further comprising:
code configured to receive information specifying a sales hierarchy of the given salesperson's employer, each role in the sales hierarchy having a set of predetermined rights and responsibilities; and
wherein the code configured to generate the results of the search to be displayed to the given salesperson further comprises code for selectively accessing visual elements of the tabular worksheet according to a role of the given salesperson defined in the sales hierarchy of the given salesperson's employer.

11. The non-transitory information storage medium of claim 8, further comprising:
code configured to receive information provided by the given salesperson's manager defining the tabular worksheet for the given salesperson; and
wherein the code configured to generate the results of the search to be displayed to the given salesperson further comprises code configured to generate the result of the search to be displayed to the given salesperson based on the information provided by the given salesperson's manager defining the tabular worksheet for the given salesperson.

12. The non-transitory information storage medium of claim 11, further including code configured to carry out the search for at least one parameter selected from customer, region, industry, product, service, origination information and unknown information.

13. The non-transitory information storage medium of claim 8, further comprising:
code configured to receive information provided by a manager of the given salesperson defining the tabular worksheet for the given salesperson; and
code configured to customize an appearance and ordering of the entries within the tabular worksheet based on the information provided by the manager of the given salesperson.

* * * * *

UNITED STATES PATENT AND TRADEMARK OFFICE
CERTIFICATE OF CORRECTION

PATENT NO. : 8,015,038 B2  Page 1 of 1
APPLICATION NO. : 10/755162
DATED : September 6, 2011
INVENTOR(S) : Gennaro et al.

It is certified that error appears in the above-identified patent and that said Letters Patent is hereby corrected as shown below:

In column 6, line 31, delete "form" and insert -- from --, therefor.

In column 6, line 39, delete "color-coded" and insert -- color-) coded --, therefor.

In column 10, line 24, in Claim 1, delete "customers;" and insert -- customer; --, therefor.

In column 10, line 55, in Claim 1, after "territory" delete "in the salesperson's sales network".

In column 11, line 7, in Claim 3, delete "receiving," and insert -- receiving --, therefor.

Signed and Sealed this
Fourteenth Day of February, 2012

David J. Kappos
*Director of the United States Patent and Trademark Office*